United States Patent [19]
Kawauchi

[11] Patent Number: 5,388,152
[45] Date of Patent: Feb. 7, 1995

[54] KEY TELEPHONE SYSTEM CAPABLE OF REGULATING VOLUME OF HANDSET

[75] Inventor: Yoshihiro Kawauchi, Hino, Japan

[73] Assignee: Kabushiki Kaisha Toshiba, Kawasaki, Japan

[21] Appl. No.: 43,875

[22] Filed: Apr. 7, 1993

[30] Foreign Application Priority Data

Apr. 7, 1992 [JP] Japan .................. 4-085561

[51] Int. Cl.⁶ .................. H04M 1/00; H04M 9/00
[52] U.S. Cl. ...................... 379/157; 379/390
[58] Field of Search ............. 379/156, 157, 389, 390

[56] References Cited

U.S. PATENT DOCUMENTS

5,199,064  3/1993  Gulick et al. .......... 379/389 X
5,212,722  5/1993  Morata ................ 379/390 X Primary Examiner—Stephen Chin
Assistant Examiner—Paul Loomis
Attorney, Agent, or Firm—Foley & Lardner

[57] ABSTRACT

A key telephone system has a main service unit including at least a main controller, a terminal interface and an office line interface, and a telephone terminal which is connected to the terminal interface. The telephone terminal includes a handset for transmitting and receiving a voice or a speech signal between a user and the other user, and a speech circuit for regulating a volume of the handset. The system comprises default value storage element for storing a default value which is a control value for setting a volume of each of the handset to a desired amount; change input element for inputting a new default value in order to change the default value each of the handset; default value renewal element for rewriting the default value into said new default value by selecting an input default value from the default value storage element when the default value of each of the handset is changed and input through the change input element; and renewal default value setting element for fixing the new default value as a reference value of the handset itself at completing a telephone call when the default value is changed to the new default value in each of the handset, and enabling a telephone call to a desired volume by using the new default value in a next chance of a telephone call.

14 Claims, 9 Drawing Sheets

| TERMINAL #00 | 0 | 1 | 0 | 0 | 0 | 0 | 0 | 0 |
|---|---|---|---|---|---|---|---|---|
| TERMINAL #01 | 0 | 0 | 0 | 0 | 1 | 0 | 0 | 0 |
| TERMINAL #02 | 0 | 1 | 0 | 0 | 0 | 0 | 0 | 0 |
| ⋮ | | | | | | | | |
| TERMINAL #n-1 | 0 | 0 | 0 | 1 | 0 | 0 | 0 | 0 |
| TERMINAL #n | 0 | 0 | 0 | 0 | 0 | 0 | 1 | 0 |

FIG. 6

| TERMINAL #00 | 0 | 1 | 0 | 0 | 0 | 0 | 0 | 0 |
|---|---|---|---|---|---|---|---|---|
| TERMINAL #01 | 0 | 0 | 0 | 0 | 1 | 0 | 0 | 0 |
| TERMINAL #02 | 0 | 1 | 0 | 0 | 0 | 0 | 0 | 0 |
| ⋮ | | | | | | | | |
| TERMINAL #n-1 | 0 | 0 | 0 | 1 | 0 | 0 | 0 | 0 |
| TERMINAL #n | 0 | 0 | 0 | 0 | 0 | 0 | 1 | 0 |

FIG. 7

SET TELEPHONE TERMINAL OF #00 TO FUNCTION SETTING MODE (1)

INPUT FUNCTION NUMBER (2)

DIRECT TERMINAL AND SELECT VOLUME DATA (0-8)

(3)

WHEN INPUTTING A PLURALITY OF TERMINALS, THE ABOVE ITEM (3) IS REPEATED.

CANCEL CONDITION FROM FUNCTION SETTING MODE (4)

KEY TELEPHONE SYSTEM CAPABLE OF REGULATING VOLUME OF HANDSET

BACKGROUND OF THE INVENTION

The present invention relates to a key telephone system, and more particularly, to a key telephone system in which a handset can be regulated.

Figure 1:
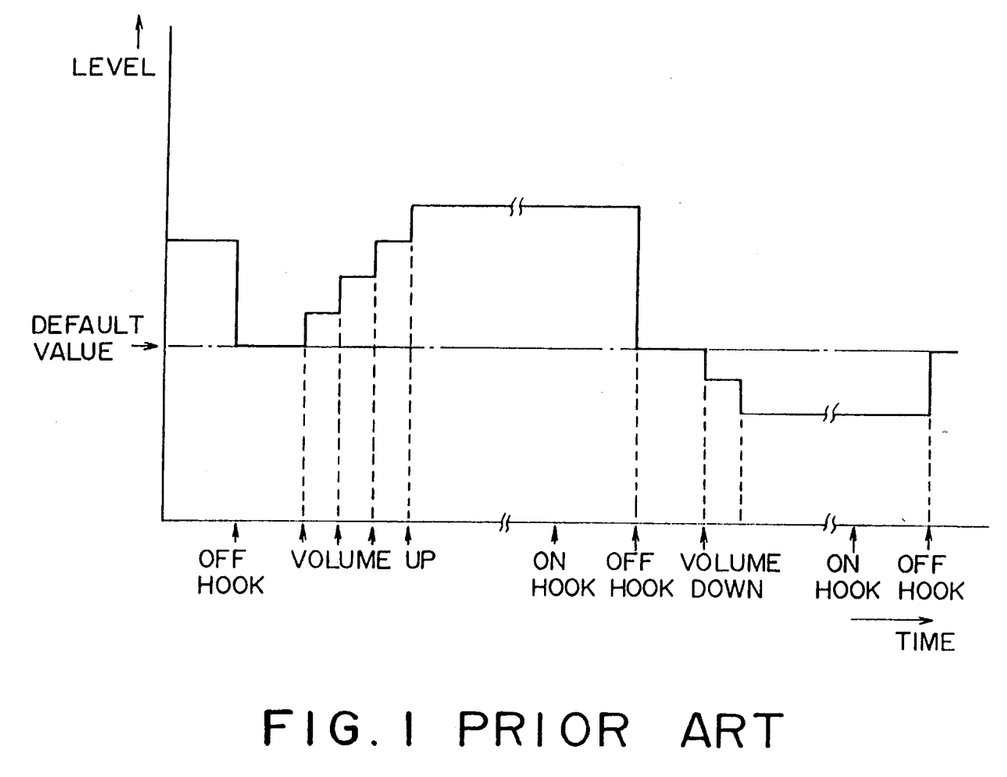
FIG. 1 is a characteristic view showing a default value for which a speech signal received by a handset is set in a conventional key telephone system.

A handset is provided with a terminal of a telephone set in a key telephone system, which is transmitting and receiving speech signals from an office line or other telephone terminals. As shown in FIG. 1, the speech signals which are supplied to the handset are set to a fixed default value as a reference. In a conventional key telephone system, when volume received by the handset is small or high, a user regulates the volume to a desired value. This regulated volume automatically returns to the fixed default value when the handset is put on a housing and becomes in a telephone call condition again.

Therefore, the conventional telephone system has the problem that the manipulation is complicated because it is necessary for the user to regulate volume again when the user talks over the telephone by using the handset.

Furthermore, since the conventional system sets to the fixed default value, this system has the problem that the predetermined volume is not only unsuitable for the user but also hard to hear because the volume is too much or little.

SUMMARY OF THE INVENTION

An object of the present invention is to provide a key telephone system capable of regulating the volume of a handset for being suitable for users in the manner that a default value for setting a volume of respective handset provided on a plurality of telephone terminals is variable and not fixed, and when the default value is changed, a changed default value is fixed as a new default value, in order to solve the above problems.

In order to achieve the above-object, a key telephone system according to the present invention and including a main service unit at least having a main controller, a terminal interface and an office line interface, and a plurality of telephone terminals each connected to the terminal interface and each having a conversion means and a handset for transmitting a voice of a user as a speech signal to other user and converting a speech signal from other user into a voice; comprises default value storage means for storing a default value which is a control value for setting a volume of each of the handset to a desired amount; change input means for inputting a new default value in order to change the default value each of the handset; default value renewal means for rewriting the default value into the new default value by selecting an input default value from the default value storage means when the default value of each of the handset is changed and input through the change input means; and renewal default value setting means for fixing the new default value as a reference value of the handset itself at completing a telephone call when the default value is changed to the new default value in each of the handset, and enabling a telephone call to a desired volume by using the new default value in a next chance of a telephone call.

When the handset is in an off hook condition, the handset receives speech signals having a predetermined default value. The telephone call is continuing when the speech signals conform a user's liking or an environment around the user, and when they do not conform the user's liking or the environment, the volume is regulated and the telephone call is performed in the regulated volume. In this manner, the regulated volume value will be used as a next set volume of the handset.

As described above, since the key telephone system according to the present invention has the main service unit having the main controller, the telephone terminal connected with the main unit, the handset provided with the telephone terminal for transmitting and receiving the speech signals, the volume regulator provided with the speech circuit of the handset for regulating the volume, and volume setting controller provided with the volume regulator for transmitting the volume set signal which is suitable for the user, it is possible for the user to take a call with desired conditions at all times.

DETAILED DESCRIPTION OF THE PREFERRED EMBODIMENT

There will now be described in detail a key telephone system of a preferred embodiment according to the present invention.

Figure 2:
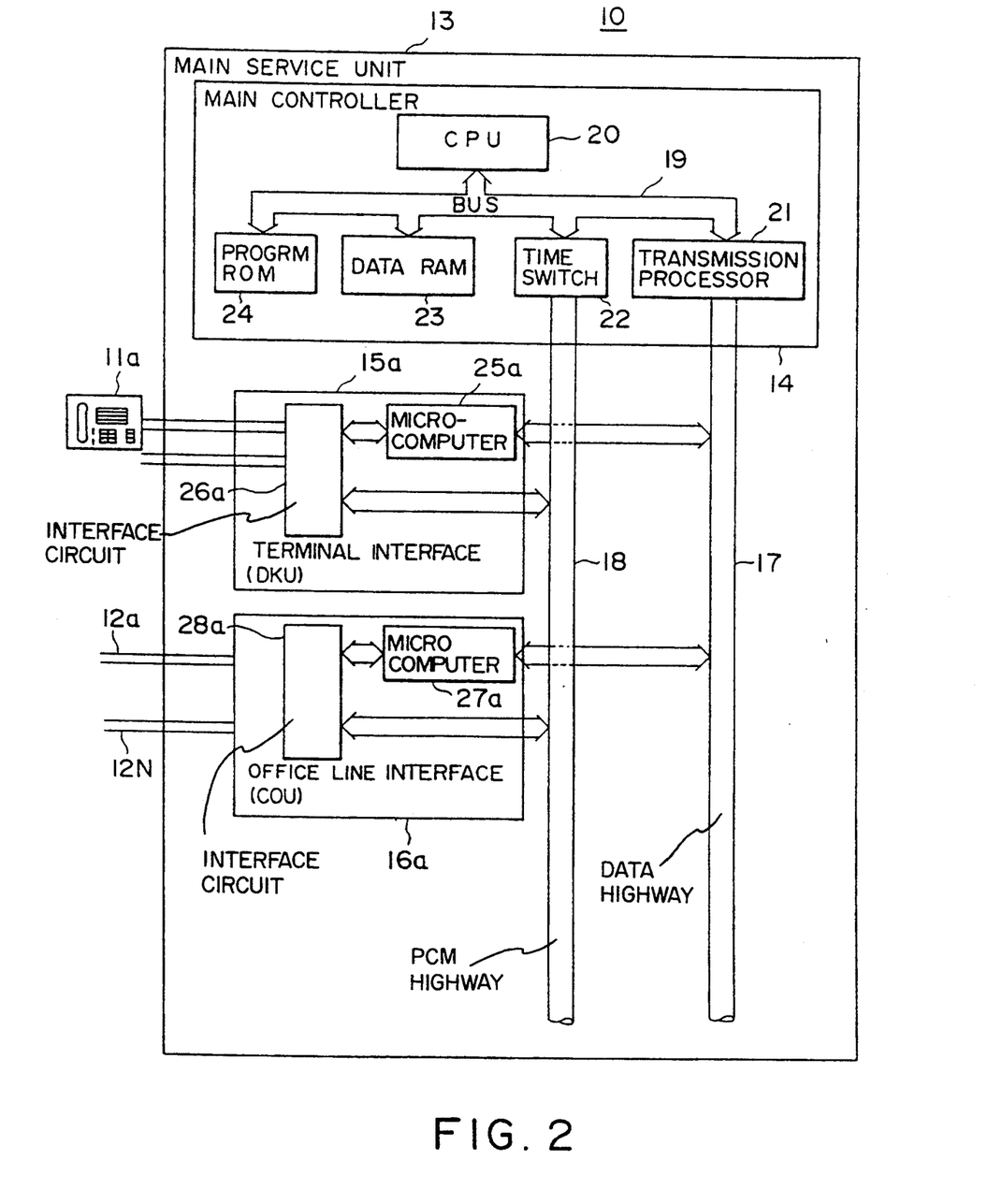
FIG. 2 is a block diagram showing an outline of a key telephone system according to an example of the present invention.

FIG. 2 is a block diagram of an outline of a key telephone system 10 of the present invention. The key telephone system 10 comprises a main unit 13 to which a plurality of telephone terminals 11a . . . and a plurality of office lines 12a . . . are connected. The main unit 13 includes a main controller 14, a plurality of terminal interfaces (DRU) 15a . . . , a plurality of office line interfaces (COU) 16a . . . , and the like, which control speech signals to transmit to a data highway 17 and a pulse width modulation (PCM) highway 18.

The main controller 14 comprises a bus 19 for connecting a central processing unit (CPU) 20, a transmission processor 21, a time switch 22, a data random access memory (RAM) 23, and a program read only memory (ROM) 24, which are provided for processing the speech signals.

One of the terminal interfaces 15a includes a microprocessor 25a connected to the data highway 17, and an interface circuit 26a which is connected to the plurality of telephone terminals 11a . . . , the PCM highway 18, and the microprocessor 25a.

One of the office line interfaces 16a includes a microprocessor 27a connected to the data highway 17, and an interface circuit 28a which is connected to the plurality of office lines 12a, the PCM highway 18, and the microprocessor 27a.

Figure 3:
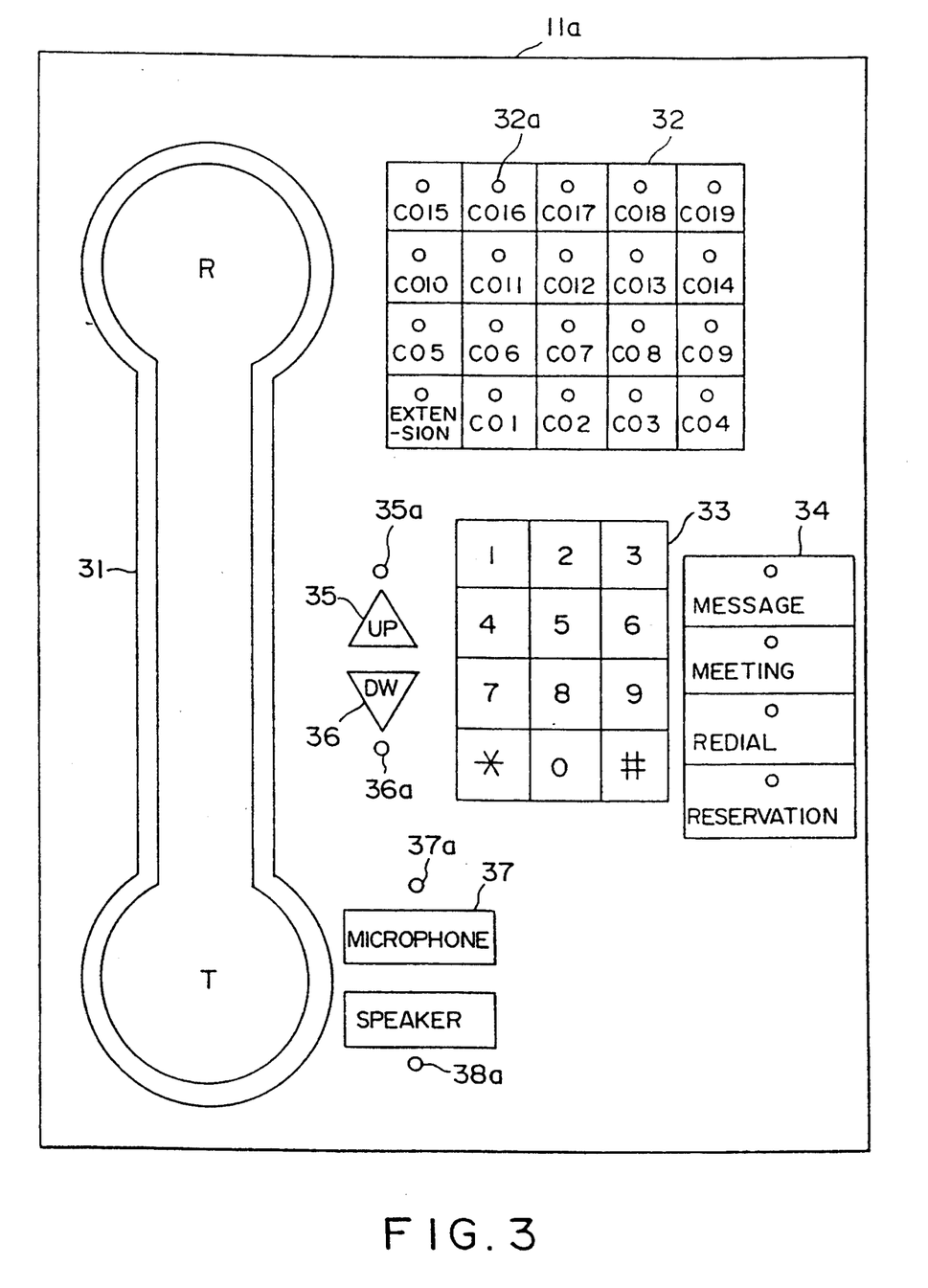
FIG. 3 is a plan view showing an outside appearance of a telephone terminal in the key telephone system according to the embodiment of the present invention.

FIG. 3 shows an outside view of the telephone terminal 11a which is connected to the main service unit 13 of the key telephone system 10. The telephone terminal 11a comprises on its outer side a handset 31, office line keys 32, dial pads 33, function keys 34, a volume-up key 35, a volume-down key 36, a microphone key 37, a speaker key 38, and display portions 32a, 34a, 35a, 36a, 37a and 38a such as LED for displaying functions thereof.

Figure 4:
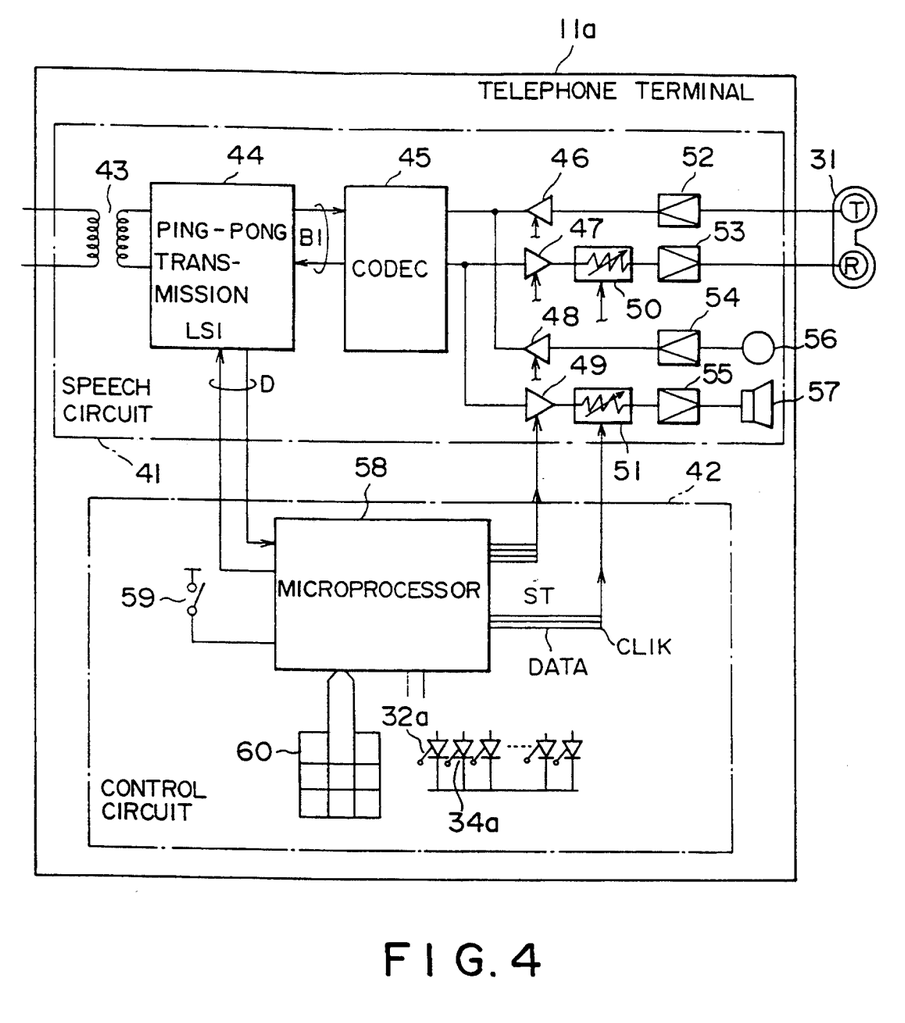
FIG. 4 is a block diagram showing an outline of a telephone terminal circuit in the key telephone system according to the embodiment of the present invention.

FIG. 4 shows a block configuration of the telephone terminal 11a shown in FIG. 3. The telephone terminal 11a comprises a speech circuit 41 and a control circuit 42.

The speech circuit 41 comprises a data transmission transducer 43, a Ping-Pong (Trade Name) transmission LSI (large scale integrated circuit) 44, a codec (AD-DA converter) 45, analog portions 46, 47, 48 and 49, speech controllers 50 and 51, amplifiers 52, 53, 54 and 55, the handset 31 a microphone 56 and a speaker 57.

The control circuit 42 comprises a microprocessor 58, a hook switch 59, dial key pads 60 and the display portions 32a, 34a, . . . , 38a such as LED.

Figure 5:
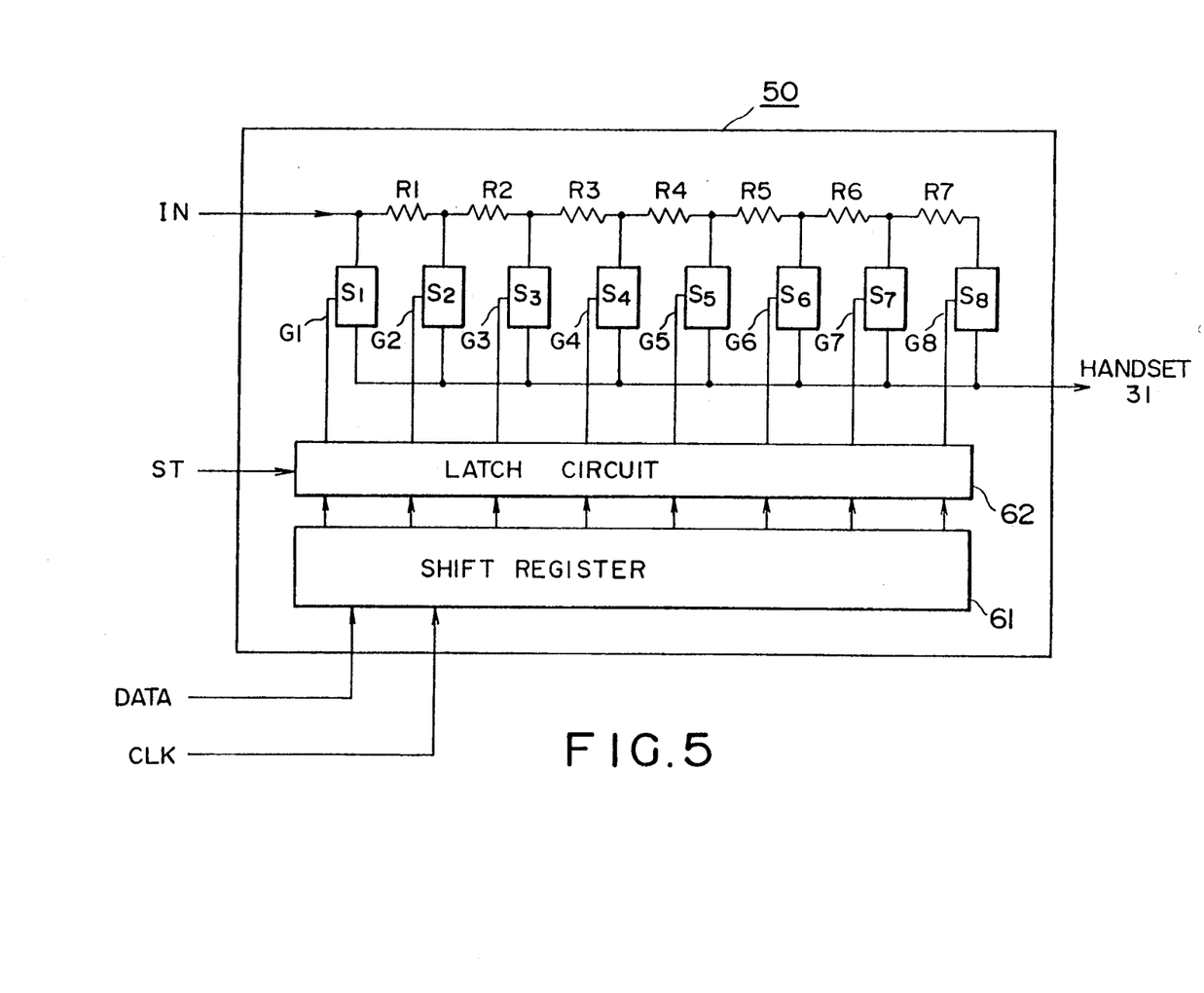
FIG. 5 is a block diagram showing an outline of a volume regulator in the telephone terminal in the key telephone system according to the embodiment of the present invention.

FIG. 5 shows a more detailed configuration of the speech controllers 50 and 51 shown in FIG. 4. For example, the speech controller 50, for regulating a volume of the handset 31, includes a plurality of resistor elements R1, R2, R3, . . . , and R7 for regulating a volume of the received speech signals, a plurality of switches S1, S2, S3, . . . , S7, and S8 which are connected both of terminals of each resistor element R1, R2, R3, . . . , or R7, a shift register 61 which is connected to a data terminal and a clock terminal for applying the microprocessor 58, and a latch circuit 62 connected to a start terminal of the microprocessor 58.

There will be described operation of such a configured key telephone system with reference to FIGS. 6 through 10.

Figure 6:
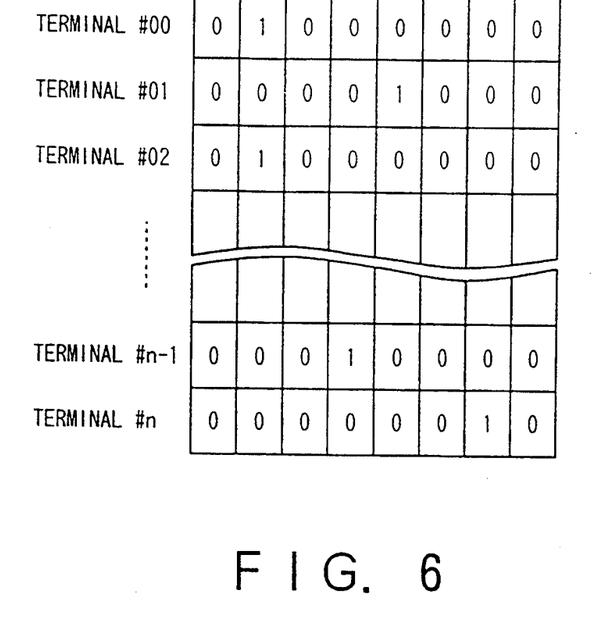
FIG. 6 is a view showing an example of a default value of environment around the user in the key telephone system according to the embodiment of the present invention.

As shown in FIG. 6, default values (such as 2, 5, . . . ) are first determined by an environment around the handsets 31 which are provided for the telephone terminals 11a (#00) and 11b (#01).

Figure 7:
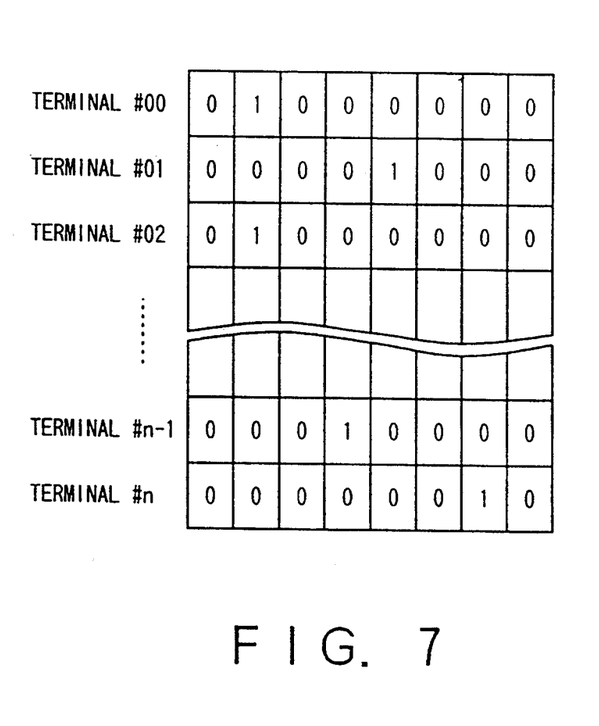
FIG. 7 is a view showing an example of a default value stored within a RAM in the key telephone system according to the embodiment of the present invention.
Figure 8:
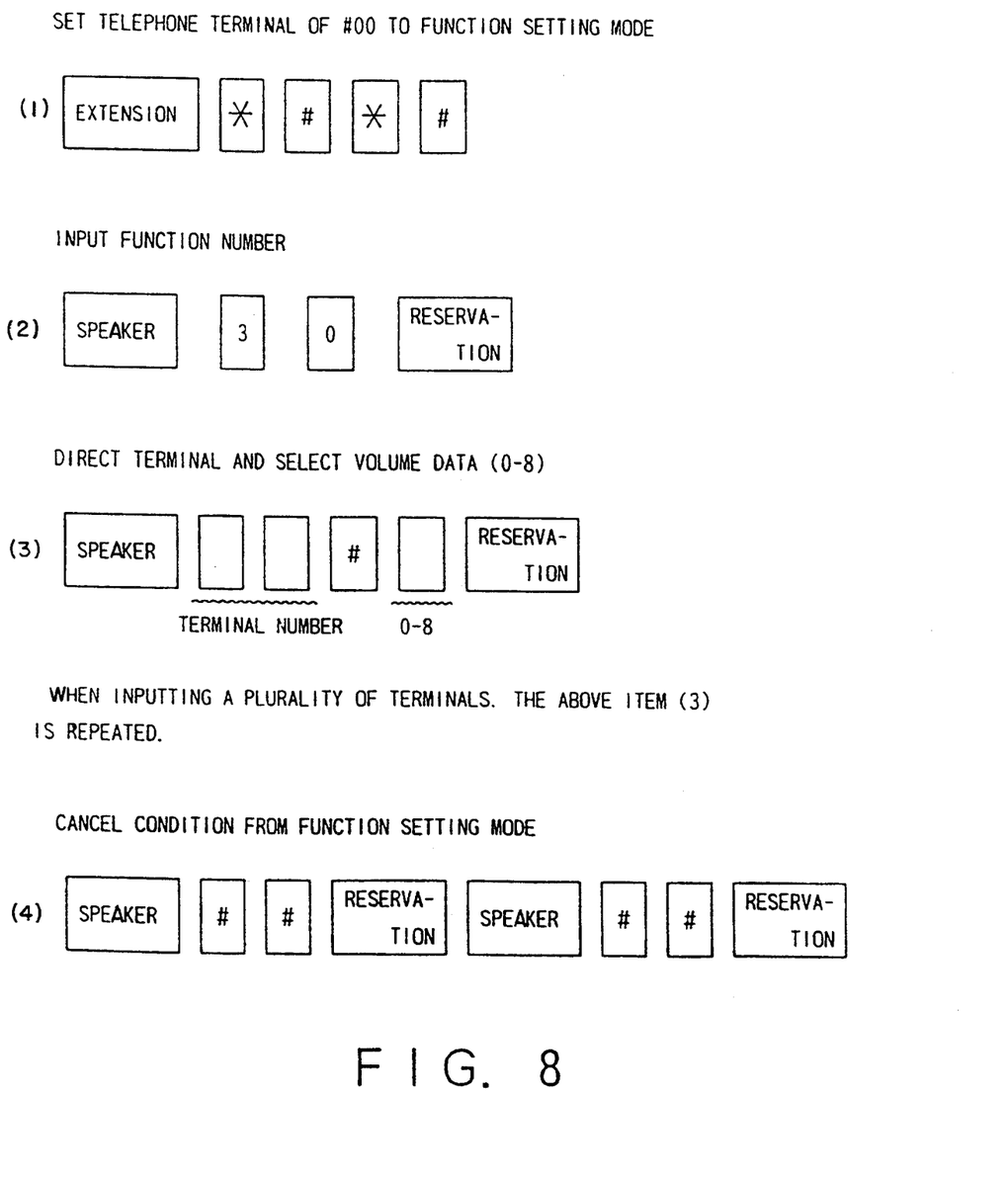
FIG. 8 is a view for explaining a storage manipulation of the default value at the telephone terminal in the key telephone system according to the embodiment of the present invention.

The default values (such as 2, 5, . . .), as shown in FIG. 7, are stored in a predetermined area in the data RAM 23 by copying each telephone terminal (#00;2, #01;5, #02;2, . . . ). FIG. 8 shows concrete operation thereof.

Now, a user takes up the handset 31 for talking over the telephone with the other at opposite end of the office line. Taking up the handset makes the hook switch 59 close to be an off-hook condition. The off-hook condition is detected by the microprocessor 58 and transmitted to the Ping-Pong LSI 44 as a transmission code signal, and at the same time, to the analog switches 46 and 47 so as to be close them.

The transmission code signal received by the Ping-Pong transmission LSI 44 is further transmitted to transmission processor 21 through the data transmission transducer 43, the interface circuit 26a, the microprocessor 25a and the data highway 17.

The transmission code signal received by the transmission processor 21 is transmitted to the program ROM 24 and the data RAM 23 through the CPU 20. The program ROM 24 reads out a default value 2 stored therein by exchanging information with the data RAM 23. The default value 2 and a program stored in the ROM 24 are processed by the CPU 20 to transmit as applied data to the transmission processor 21.

The applied data are transmitted to the terminal interface 15a and the office line interface 16a through the transmission processor 21 and the data highway 17.

The applied data received by the terminal interface 15a are transmitted to the microprocessor 58 through the microprocessor 25a, the interface circuit 26a, the data transmission transducer 43 and the Ping-Pong transmission LSI 44.

Figure 9:
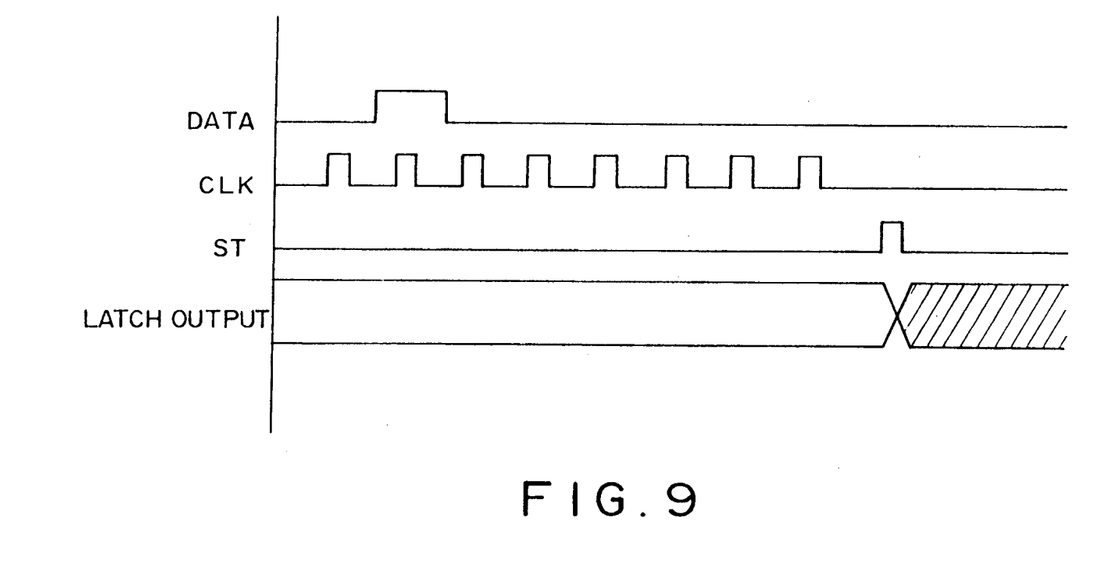
FIG. 9 is a waveform diagram showing a signal for controlling a volume regulator of the telephone terminal in the key telephone system according to the embodiment of the present invention.

The microprocessor 58 generates an applied data signal (DATA), a clock signal (CLK), and a start signal (ST), as shown in FIG. 9, and the applied data signal and the clock signal are transmitted to the shift register 61.

Next, the start signal is supplied to the latch circuit 62 which generates an output signal. The output signal makes the applied data signal and the clock signal to transmit a control signal to the control switch gate G2 both of which are turned on in order to close the switch S2.

On the other hand, the user's key telephone system can be connected with the other side through the microprocessor 27a and the interface circuit 28a by means of the applied data transmitted to the office line interface 16a, and speech signals of the other side are transmitted to the transmission processor 21 through the interface circuit 28a, the microprocessor 27a and the data highway 17.

The speech signal transmitted to the transmission processor 21 is processed by the CPU 20 and supplied to the time switch 22. The time switch 22 performs a time-division of the speech signal and transmits the signal to the speech controller 50 through the PCM highway 18, the interface circuit 26a, the data transmission transducer 43, the Ping-Pong transmission LSI 44, the codec 45 and the analog switch 46.

The speech signal transmitted to the speech controller 50 is supplied to the handset 31 through the resistor element R1 and the switch S2 which is closed, and it is possible for the user to talk over with the other by the desired default value.

When an environment around the user changes to increase noises or to become silent, the speech signal is regulated according to a flow chart shown in FIG. 9.

Figure 10:
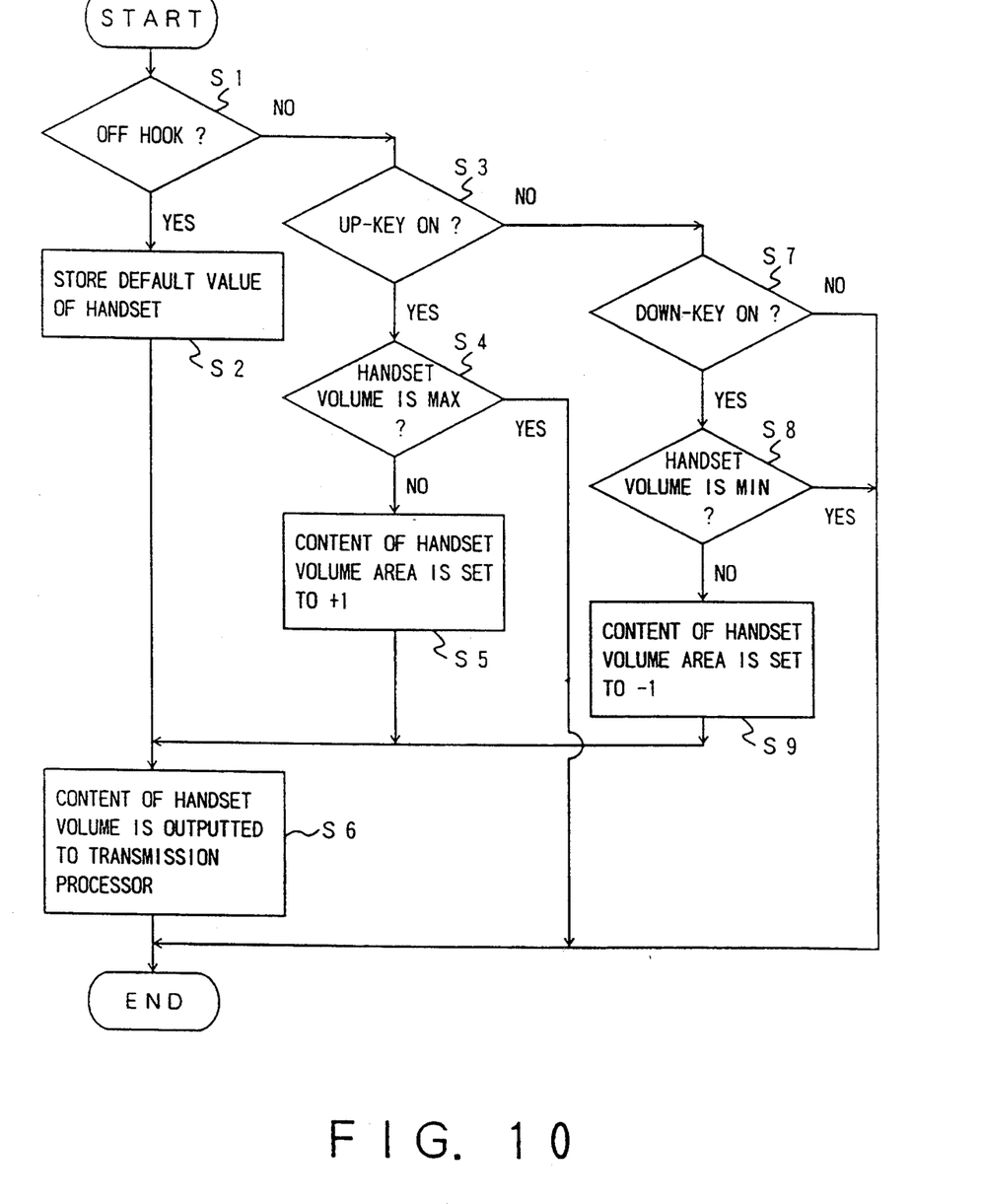
FIG. 10 is a flow chart for explaining the operation of the volume regulator at the telephone terminal of the key telephone system according to the embodiment of the present invention.

Namely, when the handset 31 is taken up, the off-hook condition is detected by the microprocessor 58 (step S1). By this detection, the default value 2 stored in the data RAM 23 of the main controller 14 is copied thus to store in the microprocessor 58 (step S2), and at the same time, when the volume is low, the necessity of a manipulation of the volume-up key is determined (step S3). When it is determined that the manipulation of the volume-up key is necessary, the volume of the handset is confirmed not to be the maximum value (step S4), and the default value of the handset increases one rank to be "3" (step S5).

The regulated default value of the handset is transmitted to the transmission processor 21 through the Ping-Pong transmission LSI 44, the data transmission transducer 43, the terminal interface 15a and the data highway 17 (step S6). The default value 3 of the telephone terminal 11a is stored in the program ROM 24 and the data RAM 23 after transmitting from the transmission processor 21 through the CPU 20. Therefore, the regulated default value 3 is a reference default value in the telephone terminal 11a when the following communication by the key telephone system.

Furthermore, when it is determined that the volume is high, the necessity of the manipulation of the volume-down key is determined (step S7). When it is determined that it is necessary to manipulate the volume-down key, it is determined that the volume of the handset is not the minimum value (step S8), the default value is reduced one to set "1" (step S9).

The regulated default value "1" of the handset volume is transmitted through the terminal interface 15a and the data highway 17 to the transmission processor 21 in the same manner as the above step (step S6). The default value "1" of the telephone terminal 11a is stored in the program ROM 24 and the data RAM 23 after transmitting from the transmission processor 20 through the CPU 20.

Accordingly, when the next call is performed by using the telephone terminal 11a, the default value "1" is a reference default value.

As described above, it is possible to make a suitable telephone call having a volume which is suitable for the user and the environment around the user because the volume can be regulated in each telephone terminal 11a and the previous default value becomes the reference default value in the successive call.

What is claimed is:

1. A key telephone system including a main service unit having a main controller, a terminal interface and an office line interface, and a plurality of telephone terminals each connected to said terminal interface and each having conversion means and a handset for transmitting voice of a user as a speech signal to another user and converting a speech signal from the other user into voice, comprising:

default value storage means provided in said main service unit for storing a default value which is a control value for setting a volume of each said handset to a desired amount;

change input means provided in each of said telephone terminals for inputting a new default value in order to change said default value in each said handset;

default value renewal means provided in said main service unit for rewriting said default value as said new default value by selecting an input default value from said default value storage means when said default value of each said handset is changed and input through said change input means; and renewal default value setting means provided in said main service unit for fixing said new default value as a reference value of said handset at completion of a telephone call when said default value is changed to said new default value in each said handset, and enabling the telephone call to a desired volume by using said new default value in a next chance of the telephone call.

2. The key telephone system according to claim 1 wherein said change input means comprises a plural number of keys arranged on a casting surface of said telephone terminal, and is constituted in a manner that said new default value input from said change input means of any of said plurality of telephone terminals can change said default values of other handsets of all telephone terminals, and wherein a change in the default can be accomplished at each of said terminals.

3. The key telephone system according to claim 1:
wherein said change input means comprises a key board system which is connected through a modem to other key telephone system which is connected to an office line and said office line interface of said main service unit, and is constituted in a manner that a default value of any handset of a specific telephone terminal of said key telephone system can be changed and fixed by manipulating keys on said key board.

4. The key telephone system according to claim 1 wherein said default value storage means, said default value renewal means, and said renewal default value setting means are constructed in said main controller of said main service unit, and said main controller comprises a data random access memory (RAM) as said default value storage means, a central processing unit (CPU) as said default value renewal means and said renewal default value setting means for executing a predetermined processing content, and a program read only memory (ROM) for storing, as a program, said predetermined processing content for execution by said CPU as said default value renewal means and said renewal default value setting means by changing and inputting said default value from said change input means.

5. The key telephone system according to claim 4:
wherein said default value storage means is constructed by a default value table which is stored in said data RAM and sets said default value of each of said handset in a plurality of stages.

6. The key telephone system according to claim 5:
wherein said default value table is constructed by a current table which temporarily stores said default values of each of said handset on the basis of said input from said change input means, and a default table for setting and rewriting said default value by contents of said current table through said default value setting means.

7. The key telephone system according to claim 1:
wherein each of said telephone terminals comprises a speech circuit including volume regulation means for regulating a volume of said voice from said handset at an optimum value in accordance with a liking of said user, and volume set means for setting said optimum volume regulated by said volume regulation means in order to output said handset.

8. The key telephone system according to claim 7:
wherein said volume regulation means is comprised of a speech controller including a plurality of resistor elements which are connected in series to an input line of said speech signal, a shift register for inputting data and clock supplied from said main service unit through said terminal interface, for temporarily storing said data and clock and for parallel transmitting parallel data including said data and clock, a latch circuit for latching therein said parallel data from said shift register corresponding to a start signal, and a plurality of switches which are connected in parallel between both ends of said plurality of resistors and an output line to said handset, respectively, and each of which includes a control switching gate inputted a parallel output from said latch circuit.

9. The key telephone system according to claim 7:
wherein said speech circuit comprises a data transmission transducer connected to said terminal interface of said main service unit, a Ping-Pong transmission LSI (large scale integrated circuit) connected to said data transmission transducer, a code connected to said Ping-Pong transmission LSI, a plurality of analog switches connected in parallel to said code, a first amplifier provided between a first switch of said analog switches and a transmitter of said handset, a first speech controller as said volume regulation means which is provided between a second switch of said analog switches and a receiver of said handset, and a second amplifier as said volume set means which is provided between said first speech controller and said receiver of said handset.

10. The key telephone system according to claim 9;
wherein said speech circuit further includes a third amplifier provided between a third switch of said analog switches, a microphone connected to said third amplifier, a second speech controller as said volume regulation means which is connected to a fourth switch of said analog switches, and a fourth amplifier as said volume set means which is connected to said second speech controller.

11. The key telephone system according to claim 7;
wherein said volume set means comprises a second amplifier which is connected to said volume regulation means and said handset.

12. The key telephone system according to claim 7;
wherein said telephone terminal further comprises a control circuit for transmitting and receiving data with said speech circuit, and for calculating and controlling a volume compensation amount which is performed by said volume regulation means when the user takes up said handset.

13. The key telephone system according to claim 12;
wherein said control circuit comprises a microprocessor connected to a Ping-Pong transmission LSI and said volume regulation means which are provided in said speech circuit and for setting a suitable condition such as a volume by transmitting and receiving necessary data, a hook switch for turning on and off said microprocessor by putting and picking said handset on and up from said telephone terminal, a dial key pad portion provided on a casing surface of said telephone terminal and for inputting said necessary data such as a telephone number of the other user, and a display portion such as an LED (light emitting device) provided on said casing surface of said telephone terminal and for displaying functions processed by said telephone terminal.

14. The key telephone system according to claim 13;
wherein said control circuit further comprises a volume-up key and a volume-down key which are provided on said casing surface of said telephone terminal and for manually controlling a volume-up and volume-down by pushed down by said user when a correction volume of said handset by said volume regulation means is insufficient to said user.

* * * * *